United States Patent
Chiu et al.

(10) Patent No.: US 9,632,362 B2
(45) Date of Patent: Apr. 25, 2017

(54) LIQUID CRYSTAL DISPLAY PANEL AND LIQUID CRYSTAL DISPLAY DEVICE CONTAINING THE SAME

(71) Applicant: INNOLUX CORPORATION, Chu-Nan, Miao-Li County (TW)

(72) Inventors: Chang-Ru Chiu, Chu-Nan (TW); Hsia-Ching Chu, Chu-Nan (TW); Feng-Lin Lin, Chu-Nan (TW); Li-Chun Chen, Chu-Nan (TW); Fu-Cheng Chen, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 215 days.

(21) Appl. No.: 14/324,037

(22) Filed: Jul. 3, 2014

(65) Prior Publication Data

US 2016/0004107 A1  Jan. 7, 2016

(51) Int. Cl.
*G02F 1/1337* (2006.01)
*G02F 1/1339* (2006.01)
*G02F 1/1333* (2006.01)

(52) U.S. Cl.
CPC ...... *G02F 1/133784* (2013.01); *G02F 1/1339* (2013.01); *G02F 2001/133388* (2013.01)

(58) Field of Classification Search
CPC .............................. G02F 1/1337; G02F 1/1339
See application file for complete search history.

(56) References Cited

U.S. PATENT DOCUMENTS

| | | | | |
|---|---|---|---|---|
| 5,078,475 A | * | 1/1992 | Sekimura | G02F 1/133345 349/106 |
| 5,338,240 A | * | 8/1994 | Kim | G02F 1/13394 349/106 |
| 6,879,359 B1 | * | 4/2005 | Kikkawa | G02F 1/133553 257/57 |
| 7,262,823 B2 | | 8/2007 | Morimoto et al. | |
| 2005/0057715 A1 | | 3/2005 | Hashimoto | |
| 2006/0232529 A1 | | 10/2006 | Midorikawa | |

(Continued)

FOREIGN PATENT DOCUMENTS

| JP | H08160427 | 6/1996 |
|---|---|---|
| JP | H1130776 | 2/1999 |

(Continued)

OTHER PUBLICATIONS

Report of Utility Model Technical Opinion issued by the Japan Patent Office for corresponding Japanese Utility Model Application No. 2014-003494 on Mar. 22, 2016.

*Primary Examiner* — Timothy L Rude
(74) *Attorney, Agent, or Firm* — Liu & Liu

(57) ABSTRACT

A liquid crystal display panel and a liquid crystal display device containing the same are disclosed. The liquid crystal display panel of the present invention comprises: a first substrate with a pixel electrode region and a non-pixel electrode region; a second substrate opposite to the first substrate; a first alignment layer disposed on the pixel electrode region and the non-pixel electrode region; and a liquid crystal layer disposed between the first substrate and the second substrate. Herein, the first alignment layer on the pixel electrode region has a first thickness, that on the non-pixel electrode region has a second thickness, and the first thickness is larger than the second thickness.

14 Claims, 11 Drawing Sheets

(56) References Cited

U.S. PATENT DOCUMENTS

| | | | |
|---|---|---|---|
| 2008/0018848 A1* | 1/2008 | Iwato | G02F 1/133711 349/149 |
| 2009/0051862 A1* | 2/2009 | Ikebe | G02F 1/1337 349/123 |
| 2009/0289260 A1 | 11/2009 | Sonoda et al. | |
| 2015/0062507 A1* | 3/2015 | Park | G02F 1/133512 349/106 |
| 2015/0131041 A1* | 5/2015 | Moriwaki | G02F 1/1337 349/106 |

FOREIGN PATENT DOCUMENTS

| | | |
|---|---|---|
| JP | 2000-267114 | 9/2000 |
| JP | 2004-361623 | 12/2004 |
| JP | 2005-084586 | 3/2005 |
| JP | 2006-301089 | 11/2006 |
| JP | 2008309832 | 12/2008 |
| JP | 2013-104990 | 5/2013 |
| TW | 513591 | 12/2002 |

\* cited by examiner

LIQUID CRYSTAL DISPLAY PANEL AND LIQUID CRYSTAL DISPLAY DEVICE CONTAINING THE SAME

BACKGROUND OF THE INVENTION

1. Field of the Invention

The present invention relates to a liquid crystal display panel and a liquid crystal display device containing the same and, more particularly, to a liquid crystal display panel with novel structured alignment layers and a liquid crystal display device containing the same.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD. Especially, the LCD can be applied to various fields. For example, the daily used devices such as cell phones, notebooks, video cameras, cameras, music players, navigation devices, and televisions are equipped with liquid crystal display (LCD) panels.

The brightness, the contrast, the color and the viewing angles are main parameters related to the viewing effect of the LCD panels. As the developments of the LCD devices, the main stream for developing LCD panels can be divided into: twisted nematic (TN) mode, vertical alignment (VA) mode, and in-plane switching (IPS) mode.

For the VA mode LCD panels, alignment layers can facilitate the orientation of the injected liquid crystal molecules to obtain the purpose of showing darkness and brightness. However, both the thin film transistor (TFT) substrate and the color filter (CF) substrate have patterns, and an altitude (or height) difference on the surface of the alignment layers is occurred due to the uniformly coated alignment layers. This altitude difference may cause the problem of non-uniform rubbing or monomer aggregation of the alignment layer, resulting in the alignment of the liquid crystal molecules not ideal enough.

Therefore, it is desirable to provide a liquid crystal display panel without the problem of non-uniform rubbing or monomer aggregation of the alignment layer, to solve the problem of disclinations of liquid crystal molecules and improve the display quality of the liquid crystal display panel.

SUMMARY OF THE INVENTION

An object of the present invention is to provide a liquid crystal display panel and a liquid crystal display device containing the same, which can solve the problem of disclinations of liquid crystal molecules to improve the display quality of the liquid crystal display panel and the device containing the same.

Another object of the present invention is to provide a method for manufacturing the aforementioned liquid crystal display panel.

To achieve the object, an aspect of the present invention is to provide a liquid crystal display panel, comprising: a first substrate having a first surface; a second substrate opposite to the first substrate; a liquid crystal layer disposed between the first substrate and the second substrate; a first alignment layer disposed on the first substrate and having a second surface and a third surface, wherein the second surface faces to the first substrate, and the third surface is adjacent to the liquid crystal layer; and at least one spacer disposed between the first substrate and the second substrate. Herein, the first substrate comprises a first region, a second region and a third region, the spacer is disposed to correspond to the first region, a distance between the second surface of the first alignment layer and the first surface of the first substrate in the second region is smaller than that in the third region, the first alignment layer in the second region and the third region respectively has a first thickness and the second thickness, and the first thickness is larger than the second thickness.

In general, several kinds of elements having different heights are laminated on the first substrate of the liquid crystal panel. In the liquid crystal display panel of the present invention, although the distances between the second surface of the first alignment layer and the first surface of the first substrate (in short, the distance between the first alignment layer and the first substrate) in the second region and the third region are different, the altitude difference of the third surface of the first alignment layer in the second region and the third region can be minimized by adjusting the thickness of the first alignment layer; and therefore, the problem of non-uniform rubbing or monomer aggregation of the alignment layer can be prevented to improve the display quality of the liquid crystal display panel. Particularly, the distances between the third surface of the first alignment layer and the first surface of the first substrate in the second region and the third region are different, and the distance difference between the second region and the third region can be greatly reduced by adjusting the thickness of the first alignment layer, in the liquid crystal display panel of the present aspect of the present invention.

In the aspect of the present invention, a pixel electrode may be disposed on the second region of the first substrate, a data line and a scan line may be disposed on the third region of the first substrate, wherein the first thickness of the first alignment on the pixel electrode is larger than the second thickness of the first alignment layer on at least one of the data line and the scan line.

In addition, another aspect of the present invention is to provide a liquid crystal display panel, comprising: a first substrate with a pixel electrode region and a non-pixel electrode region formed thereon; a second substrate opposite to the first substrate; a first alignment layer disposed on the pixel electrode region and the non-pixel electrode region; and a liquid crystal layer disposed between the first substrate and the second substrate. Herein, the first alignment layer on the pixel electrode region has a first thickness, the first alignment layer on the non-pixel electrode region has a second thickness, and the first thickness is larger than the second thickness.

More specifically, in this aspect of the liquid crystal display panel of the present invention, the pixel electrode region comprises an aperture region and a non-aperture region; wherein a first thickness of the first alignment layer on the aperture region of the pixel electrode region is larger than a second thickness of the first alignment layer on the non-pixel region.

In this aspect of the liquid crystal display panel of the present invention, the pixel electrode region or the aperture region thereof may comprise a pixel electrode, and the non-pixel electrode region may comprise a data line and a scan line. Herein, a first thickness of the first alignment layer on the pixel electrode is larger than the second thickness of the first alignment layer on at least one of the data line and the scan line.

Generally, the thickness of the data line or/and the scan line is larger than that of the pixel electrode in the liquid crystal display panel. Hence, in the liquid crystal display panel of the present invention, the first thickness of the first alignment layer on the pixel electrode (particularly, the pixel electrode in the aperture region of the pixel electrode region) is designed to be larger than the second thickness thereof on the data line and/or the scan line, so the altitude difference of the surface of the first alignment layer on the pixel region and the data line or/and the scan line can be reduced. Therefore, the problem of non-uniform rubbing or monomer aggregation of the alignment layer can be prevented to improve the display quality of the liquid crystal display panel.

In addition, the present invention further provides a method for manufacturing the aforementioned liquid crystal display panel, comprising: providing a first substrate and a second substrate, wherein the first substrate has a first surface and comprises a first region, a second region and a third region, and the second substrate is opposite to the first substrate; forming a first alignment layer on the first substrate, wherein the first alignment layer has a second surface facing to the first substrate and a third surface, the distance between the second surface of the first alignment layer and the first surface of the first substrate in the second region is less than that in the third region, and a first thickness of the first alignment layer in the second region is larger than a second thickness thereof in the third region; and injecting a liquid crystal layer between the first substrate and the second substrate. More specifically, a pixel electrode can be disposed on the second region of the first substrate to form a pixel electrode region, a scan line and a data line can be disposed on the third region of the first substrate to form a non-pixel region, and a first thickness of the first alignment layer on the pixel electrode in the aperture region of the pixel electrode region is larger than a second thickness thereof on at least one of the scan line and the data line in the non-pixel region. In addition, at least one spacers may be further disposed between the first substrate and the second substrate, which corresponds to the first region of the first substrate.

In the method of the present invention, the alignment layer can be patterned to have different thickness through any conventional patterning manner used in the art. For example, a printing plate such as an APR plate with specific microstructures can be used to prepare the patterned alignment layer through directly printing; an alignment layer with an uniform thickness is firstly formed and then a photolithography is performed thereon to form a patterned alignment layer; or an alignment layer with an uniform thickness is firstly formed, imprinted before curing, and then cured to form a patterned alignment layer. However, the manner used to prepare the patterned alignment layer of the present invention is not limited to the aforementioned manners.

In the liquid crystal display panel and the method for manufacturing the same of the present invention, the problem of the disclinations of liquid crystal molecules can be solved, once the first thickness (T1) of the first alignment layer is larger than the second thickness (T2) thereof. Preferably, a ratio of the first thickness to the second thickness (T1/T2) is in a range from 1 to 10 ($1 \leq T1/T2 \leq 10$). More preferably, this ratio is in a range from 1 to 5 ($1 \leq T1/T2 \leq 5$). Most preferably, this ratio is in a range from 2 to 4 ($2 \leq T1/T2 \leq 4$). However, this ratio is not limited to the aforementioned range, and can be adjusted according to the distance between the second surface of the first alignment layer and the first surface of the first substrate, for example, the distances between the first substrate and the upper surfaces of the pixel electrode, the data line as well as the scan line.

The liquid crystal display panel and the method for manufacturing the same of the present invention can be applied to not only the conventional liquid crystal display panel configured with a thin film transistor substrate and a color filter substrate, but also the liquid crystal display panel configured with a color filter on array (COA) structure.

The liquid crystal display panel configured with the COA structure may further comprise a color filter unit disposed on the first substrate and between the first substrate and the first alignment layer. Additionally, a second protection layer may further be disposed on the color filter unit. More specifically, the color filter unit, the second protection layer, the pixel electrode and the first alignment layer are sequentially laminated on the first substrate. In addition, a black matrix can be further disposed on the second substrate, a second alignment layer is disposed on the second substrate and the black matrix, and the second alignment layer on the black matrix has a fourth thickness. Furthermore, at least one spacer may further be disposed between the first substrate and the second substrate and correspond to the black matrix. Preferably, the spacer is disposed on the second substrate. When the first substrate and the second substrate are assembled with each other, the spacer therebetween can provide a predetermined space for the injection of liquid crystal molecules. When the spacer is disposed on the first substrate, the first alignment layer covers the spacer and has a third thickness, which is thinner than the first thickness and the second thickness. A more preferable case is that the spacer is disposed on the second substrate, and the second alignment layer covers the spacer and has a third thickness, which is less than the fourth thickness of the second alignment layer on the black matrix. Meanwhile, the third thickness is also less than the first thickness and the second thickness. In some cases, the third thickness of the alignment layer on the spacer is close to 0 nm; and in other word, the third thickness thereof is hardly to be detected.

In the liquid crystal display panel and the method for manufacturing the same of the present invention, a thin film transistor unit and a first protection layer may be further disposed on the first substrate, the thin film transistor unit comprises: a gate electrode, an insulating layer, a semiconductor layer, a source electrode and a drain electrode; wherein the insulating layer covers the gate electrode, the semiconductor layer is disposed on the insulating layer, the source electrode and the drain electrode are disposed on the semiconductor layer and separated in a predetermined distance to form a channel region, the first protection layer covers the thin film transistor unit and has an opening to expose the drain electrode, the pixel electrode is disposed on the first protection layer and extends into the opening to electrically connect with the drain electrode, and the first alignment layer in the opening has a fifth thickness, which is larger than the first thickness. In addition, in the liquid crystal display panel configured with the COA structure, the fifth thickness is larger than both the first thickness and the second thickness. Herein, the first protection layer on the first substrate covers not only the thin film transistor but also the data line and the scan line.

Furthermore, in the liquid crystal display panel and the method for manufacturing the same of the present invention, the material for the alignment layer (including the first alignment layer and the second alignment layer) is not particularly limited, and can be any material generally used in the art, such as polyimide (PI), polyvinylcinnamate (PVCN), and polymethylmethacrylate (PMMA); but the present invention is not limited thereto. Preferably, the material for the alignment layer of the present invention is PI.

In the liquid crystal display panel and the method for manufacturing the same of the present invention, not only the thickness of the alignment layer (including the first alignment layer and the second alignment layer) can be differed, but also at least one protrusion, at least one hump or a combination thereof can further be formed on the surface of the alignment layer. Preferably, the first substrate comprises a display region and a non-display region, and the aforementioned protrusion and hump are disposed on the first alignment layer corresponding to the non-display region of the first substrate. In addition, the second substrate may also comprise a display region and a non-display region, which respectively correspond to the display region and the non-display region of the first substrate; and the aforementioned protrusion and hump are also disposed on the second alignment layer corresponding to the non-display region of the second substrate. Preferably, the aforementioned protrusion and hump are disposed on a periphery region of the first alignment layer and/or the second alignment layer. The disposition of the protrusion and the hump can increase the pressure that the alignment layer applies to the substrate (including the first substrate and the second substrate) and the adhesion between the alignment layer and the substrate. Additionally, the disposition thereof can also solve the problem of the overflow of the material for preparing the alignment layer and the shrink of the alignment layer during the curing process, and therefore the shift of the alignment layer can be inhibited.

Herein, in both the first alignment layer and the second alignment layer, a material of the alignment layer is the same as that of the protrusion and/or the hump. In addition, the protrusion or the hump is integrated with the alignment layer. In the present invention, an APR plate or a photo mask having specific structures corresponding to the protrusion and/or the hump can be used to form the alignment layer and the protrusion and/or the hump at the same time or separately. Herein, the term "protrusion" means a protruding unit having a height of more than 30 nm from the top thereof to the surface of the alignment layer; and the term "hump" means that having a height of less than 30 nm. In addition, the protrusion of the present invention has an uneven surface or a ridge-like structure.

In the liquid crystal display panel and the method for manufacturing the same of the present invention, the viscosity of the material of the alignment layer is related to the polymerization degrees or the types of the used polymer. For example, the material of the alignment layer has higher viscosity as the polymerization degree of the used polymer increased. Hence, in one embodiment of the present invention, a material having high viscosity such as a polymer having high molecular weight can be used to form the alignment layer. In this case, at least one protrusion, at least one hump, or a combination thereof can be formed on the surface of the alignment layer; and preferably, both the protrusion and the hump are formed thereon. In addition, when the protrusion is formed on the surface of the alignment layer, a ratio of a height of the protrusion (more specifically, which is the height from the top of the protrusion to the surface of the alignment layer) to a thickness of the first alignment layer adjacent to the protrusion is in a range from 2 to 10. In another aspect of the present invention, a material having low viscosity such as a polymer having small molecular weight can be used to form the alignment layer. In this case, humps are formed on the surface of the alignment layer; and additionally an edge of the alignment may further have a wave configuration. Herein, the term "wave configuration" may include the arc shape, the zigzag shape, the curve shape or a combination thereof.

In the liquid crystal display panel and the method for manufacturing the same of the present invention, the alignment layer (including the first alignment layer and the second alignment layer) may selectively comprise plural particles, wherein the particles in the non-display region is larger than those in the display region. Herein, the term "particle" includes nucleuses, crystals, grains or aggregations, as long as significant particles formed in the alignment layer are belonged to the definition of the particle of the present invention. Especially, in some aspects of the present invention, not only the APR plate or the photo mask with specific microstructure can be used to form the hump, but also the hump may be formed due to the aggregation of the plural particles.

In addition, in the liquid crystal display panel and the method for manufacturing the same of the present invention, a sealant is used to assemble the first substrate and the second substrate. Hence, the liquid crystal display panel of the present invention may further comprise a sealant disposed between the first substrate and the second substrate, and selectively covering parts of the alignment layer. More specifically, the sealant selectively covers the periphery region of the alignment layer. When the protrusion and/or the hump are formed on the alignment layer, the sealant preferably covers parts of the protrusion and/or the hump. The disposition of the protrusion and/or the hump can increase the contact area between the sealant and the alignment layer, and therefore the peeling problem of the sealant from the alignment layer can be improved.

Furthermore, the present invention further provides a liquid crystal display device, which comprises: a backlight module; and the aforementioned liquid crystal display panel disposed on the backlight module.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1:
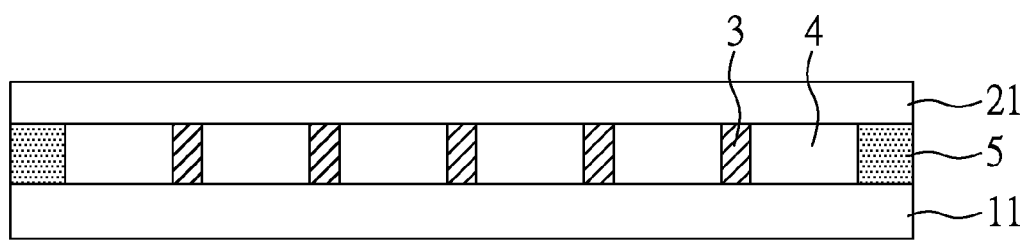
FIG. 1 is a perspective view of a liquid crystal panel according to one preferred embodiment of the present invention.

FIG. 1 is a perspective view of a liquid crystal panel according to one preferred embodiment of the present invention. The liquid crystal display panel of the present embodiment is a liquid crystal display panel configured with a color filter on array (COA) structure, which comprises: a first substrate 11, a second substrate 21, plural spacers 3, a liquid crystal layer 4 and a sealant 5. The first substrate 11 and the second substrate 21 are opposite to each other, the spacers 3 and the liquid crystal layer 4 are disposed between the first substrate 11 and the second substrate 21, and the first substrate 11 and the second substrate 21 are assembled to each other with the sealant 5. The detail units disposed on the first substrate 11 and the second substrate 21 are not shown in FIG. 1. Hereinafter, the units disposed on the first substrate 11 and the second substrate 21 and the manufacturing process thereof are described below.

Figure 2:
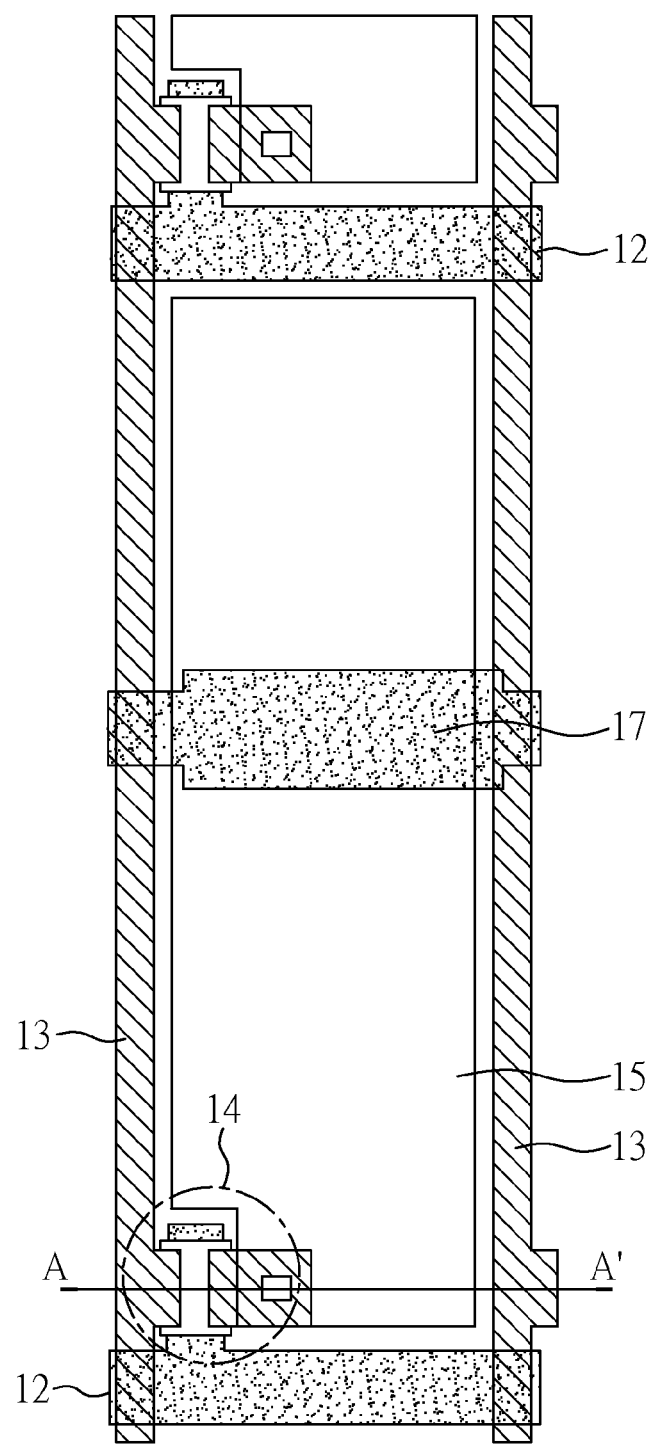
FIG. 2 is a perspective view showing a first substrate and a structure formed thereon according to one preferred embodiment of the present invention.

FIG. 2 is a perspective view showing a first substrate and a structure formed thereon as a thin film transistor (TFT) substrate of the liquid crystal display panel of the present embodiment; and FIG. 3 is a cross-sectional view showing a first substrate and a structure formed thereon according to the A-A' section line of FIG. 2. The TFT substrate comprises: a first substrate 11 with scan lines 12, data lines 13, a thin film transistor (TFT) unit 14, a pixel electrode 15, and a capacitor electrode 17 formed thereon. Herein, a pixel unit is defined with two adjacent scan lines 12 and two adjacent data lines 13, which comprises a TFT unit 14, a pixel electrode 15, and a capacitor electrode 17, and the pixel electrode 15 is disposed between two adjacent scan lines 12 and two adjacent data lines 13. Herein, the scan lines 12, the data lines 13 and the capacitor electrode 17 can be made of any conductive material generally used in the art, such as metal, alloy, metal oxide, metal oxinitride, or other electrode material used in the art; and preferably metal.

Figure 3A:
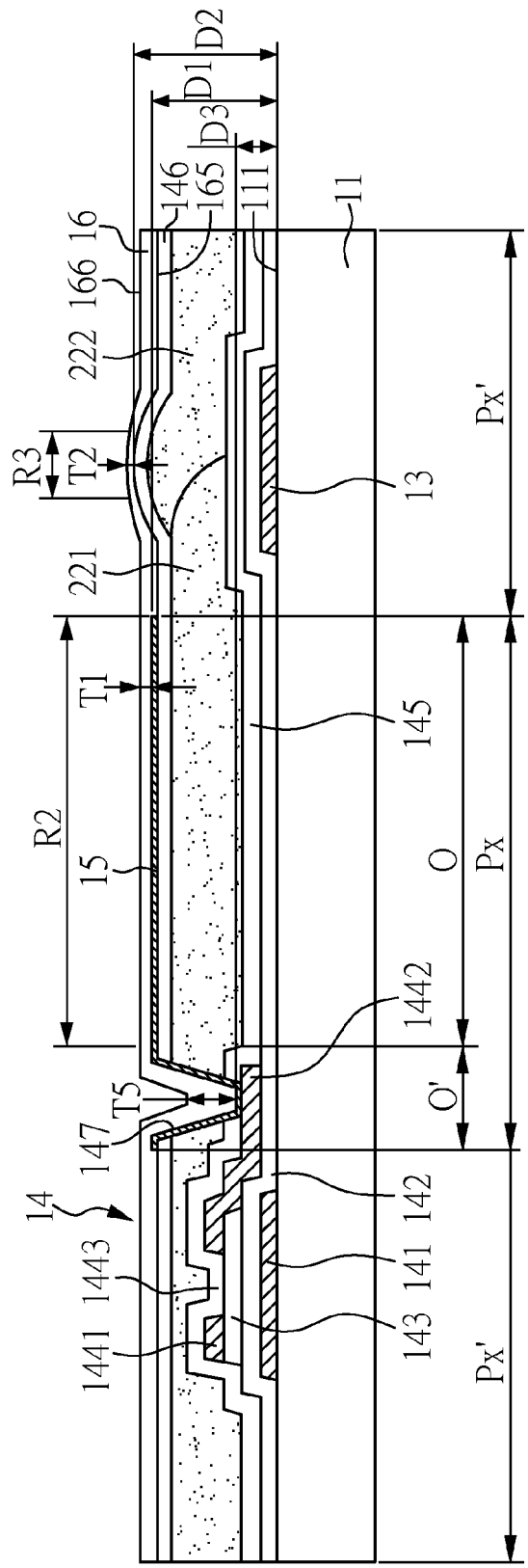
FIGS. 3A-3C are cross-sectional views showing a first substrate and a structure formed thereon according to one preferred embodiment of the present invention.

FIG. 3A is a cross-sectional view showing a first substrate and a structure formed thereon according to the A-A' section line of FIG. 2. The TFT substrate of the present embodiment comprises: a first substrate 11, a data line 13, a scan line (not shown in the figure) and a TFT unit 14, wherein the data line 13, the scan line and the TFT unit 14 are disposed on the first substrate 11. The TFT unit 14 comprises: a gate electrode 141 disposed on the first substrate 11; an insulating layer 142 (also called as a gate insulating layer) covering the gate electrode 141 and the first substrate 11; a semiconductor layer 143 disposed on the insulating layer 142; and a source electrode 1441 and a drain electrode 1442 disposed on the semiconductor layer 143 and separated in a predetermined distance to form a channel region 1443. Herein, the insulating layer 142 also covers the data line 13 and the scan line (not shown in the figure). In the present embodiment, the TFT unit 14 can be manufactured by the conventional process generally used in the art, so the process thereof is not shown herein. In addition, the first substrate 11 can be any substrate generally used in the art, such as a glass substrate, a plastic substrate, a silicon substrate and a ceramic substrate. Furthermore, the material for the gate electrode 141 can be any conductive material generally used in the art, such as metal, alloy, metal oxide, metal oxinitride, or other electrode material used in the art; and preferably metal. However, the present invention is not limited thereto. The material for the insulating layer 142 can be any insulating material generally used in the art, such as SiN; the material for the semiconductor layer 143 can be any semiconductor material generally used in the art comprising amorphous silicon, polysilicon, organic materials such as P13, DH4T and pentacene; but the present invention is not limited thereto.

As shown in FIG. 3A, after the data line 13, the scan line (not shown in the figure) and the TFT unit 14 are formed, a first protection layer 145 is formed to cover the data line 13, the scan line (not shown in the figure) and the TFT unit 14; then, color filter units 221, 222 are formed to cover the first protection layer 145, wherein the adjacent color filter units 221, 222 are formed by photoresist with different colors; and a second protection layer 146 is formed to cover the color filter units 221, 222. Then, a connecting opening 147 is further formed in the color filter units 221, 222, the first protection layer 145 and the second protection layer 146 to expose the drain electrode 1442; and a pixel electrode 15 is disposed on the second protection layer 146 and extends into the connecting opening 147 to electrically connect with the drain electrode 1442. Herein, the material for the first protection layer 145 and the second protection layer 146 can be any material generally used as the passivation material of the art, such as SiOx. In addition, the pixel electrode 15 can be a patterned electrode generally used in the art, such as a dendrite-like electrode or a zigzag electrode; and the material thereof can be any transparent conductive material generally used in the art, such as transparent conductive oxide comprising ITO or IZO.

Finally, as shown in FIG. 3A, the second protection layer 146 and the pixel electrode 15 are coated with a photo alignment monomer. After the photo alignment monomer is cured, a first alignment layer 16 is formed. In the present embodiment, the first alignment layer 16 does not have a uniform thickness, and the thickness thereof is adjusted according to the altitude of the units below the first alignment layer 16. Hence, the altitude difference of the upper surface of the first alignment layer 16 can be minimized. Herein, a printing plate such as an APR plate with specific microstructures can be used to prepare the patterned alignment layer through directly printing; an alignment layer with an uniform thickness is firstly formed and then a photolithography is performed thereon to form a patterned alignment layer; or an alignment layer with an uniform thickness is firstly formed, imprinted to have different thickness before curing, and then cured to form a patterned alignment layer. However, the manner used to prepare the patterned alignment layer of the present invention is not limited to the aforementioned manners. After the aforementioned process, the TFT substrate of the present embodiment is finished. Hereinafter, the design of the first alignment layer 16 is described in detail.

As shown in FIG. 3A, a pixel electrode region Px and a non-pixel electrode region Px' are formed on the first substrate 11, wherein the pixel electrode region Px corresponds to the region having the pixel electrode 15 formed thereon, and the non-pixel electrode region Px' corresponds to the region without the pixel electrode 15 and with the data line 13 and the scan line (not shown in the figure) formed thereon. More specifically, the pixel electrode region Px comprises an aperture region O and a non-aperture region O', wherein the aperture region O corresponds to the pixel electrode 15 which does not overlap with the TFT unit 14, and the non-aperture region O' corresponds to the region that the TFT unit 14 is disposed below the pixel electrode 15. The first alignment layer 16 on the pixel electrode region Px (especially, the aperture region O of the pixel electrode region Px) has a first thickness T1, that on the non-pixel electrode region Px' has a second thickness T2, and the first thickness T1 is larger than the second thickness T2. Preferably, a ratio of the first thickness T1 to the second thickness T2 (T1/T2) is in a range from 1 to 10 ($1 \leq T1/T2 \leq 10$). More preferably, this ratio is in a range from 1 to 5 ($1 \leq T1/T2 \leq 5$). Most preferably, this ratio is in a range from 2 to 4 ($2 \leq T1/T2 \leq 4$). In the present embodiment, the first thickness T1 can be in a range from 0.1 μm to 0.2 μm and the second thickness T2 can be in a range from 0.01 μm to 0.08 μm.

However, the thickness of the first alignment layer 16 is not limited to the aforementioned range, as long as the thickness of the first alignment layer 16 is reduced as the altitude (or height) of the units below the first alignment layer 16 increased, and therefore the purpose of reducing the altitude difference of the upper surface of the first alignment layer 16 can be achieved. More specifically, as shown in FIG. 3A, the first substrate 11 has a first surface 111, the first alignment layer 16 has a second surface 165 (bottom surface) and a third surface 166 (upper surface) opposite to the second surface 165, wherein the second surface 165 faces to the first substrate 11, and the third surface 166 is adjacent to the liquid crystal layer (not shown in the figure). Herein, the region of the first substrate 11 with the pixel electrode 15 formed thereon (especially the aperture region O) is defined as a second region R2, and that with the data line 13, the scan line (not shown in the figure), and the overlapped color filter units 221, 222 formed thereon is defined as a third region R3. Based on the first surface 111 of the first substrate 11, a distance D1 between the second surface 165 of the first alignment layer 16 and the first surface 111 of the first substrate 11 in the second region R2 is smaller than a distance D2 in the third region R3, the first alignment layer 16 in the second region R2 and the third region R3 respectively has a first thickness T1 and the second thickness T2, and the first thickness T1 is larger than the second thickness T2. Especially, in the liquid crystal display panel of the present embodiment, the difference between the distance from the third surface 166 of the first alignment layer 16 to the first surface 111 of the first substrate 11 in the second region R2 and that in the third region R3 can be greatly reduced.

Herein, only the second region R2 and the third region R3 are exemplified in FIG. 3A, but second region R2 and the third region R3 are not limited to the region exemplified in FIG. 3A and can be other regions on the first substrate 11, as long as the distance D1 in the second region R2 is smaller than the distance D2 in the third region R3. In addition, only the region containing the data line are exemplified, but the first alignment layer corresponding to the region containing the scan line can have the similar thickness design to that containing the data line.

In addition, as shown in FIG. 3A, the first alignment layer 16 in the connecting opening 147 has a fifth thickness T5. Based on the first surface 111 of the first substrate 11, a distance D3 between the second surface 165 of the first alignment layer 16 and the first surface 111 of the first substrate 11 in the connecting opening 147 is smaller than both the aforementioned distances D1 and D2. Hence, in order to reduce the distance from the third surface 166 of the first alignment layer 16 to the first surface 111 of the first substrate 11, the fifth thickness T5 is designed to be larger than both the first thickness T1 and the second thickness T2.

Figure 3B:
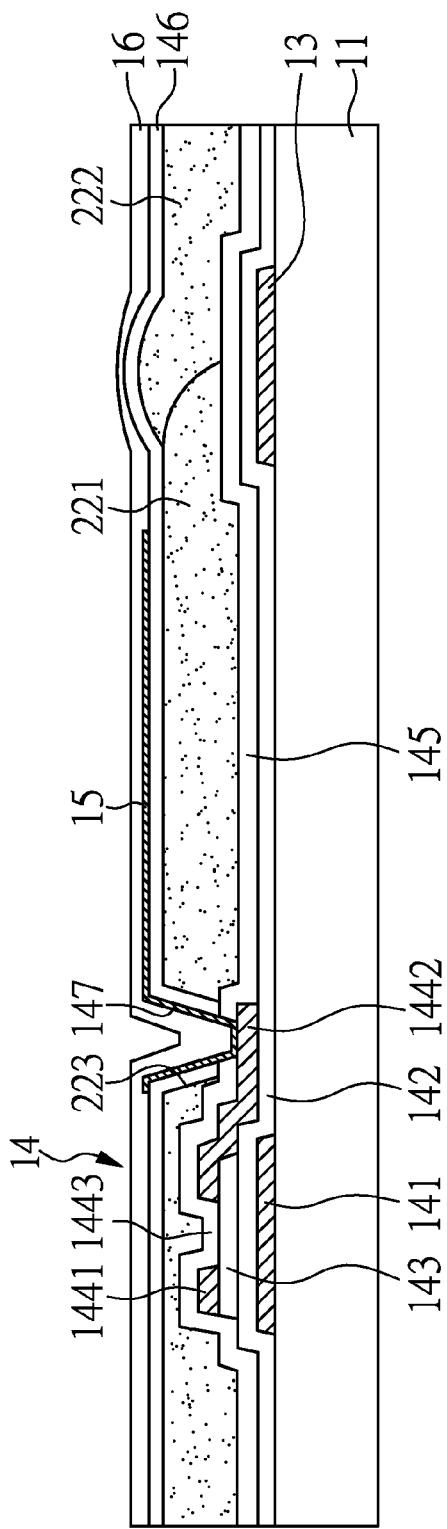
Figure 3C:
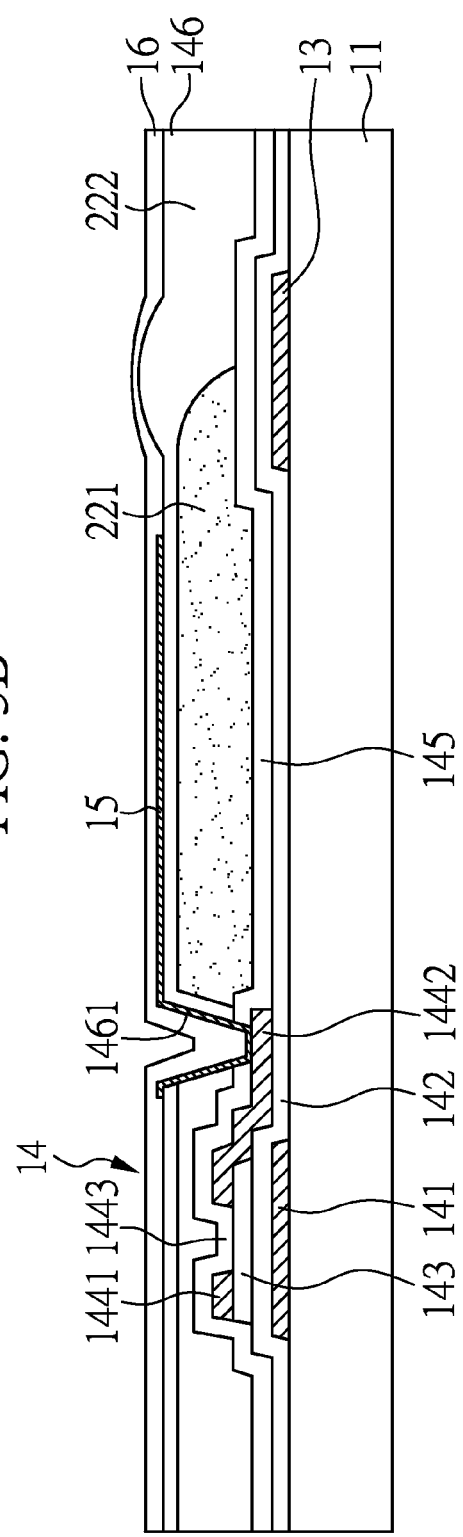

Furthermore, in another preferred embodiment, as shown in FIG. 3B, after the color filter units 221, 222 are formed, a color filter opening 223 is firstly formed, a second protection layer 146 is formed to cover a sidewall of the color filter opening 223, and then a connecting opening 147 is further formed in the first protection layer 145 and the second protection layer 146 to expose the drain electrode 1442. In further another embodiment, as shown in FIG. 3C, only the color filter unit 221 is formed between the TFT unit 14, the data line 13 and the scan line (not shown in the figure), and a second protection layer 146 is directly formed on the TFT unit 14, the data line 13 and the scan line (not shown in the figure). In the embodiments shown in FIGS. 3B and 3C, the first alignment layer 16 is also designed to have different thickness as disclosed above, and therefore the thickness of the first alignment layer 16 is not described herein.

Figure 4:
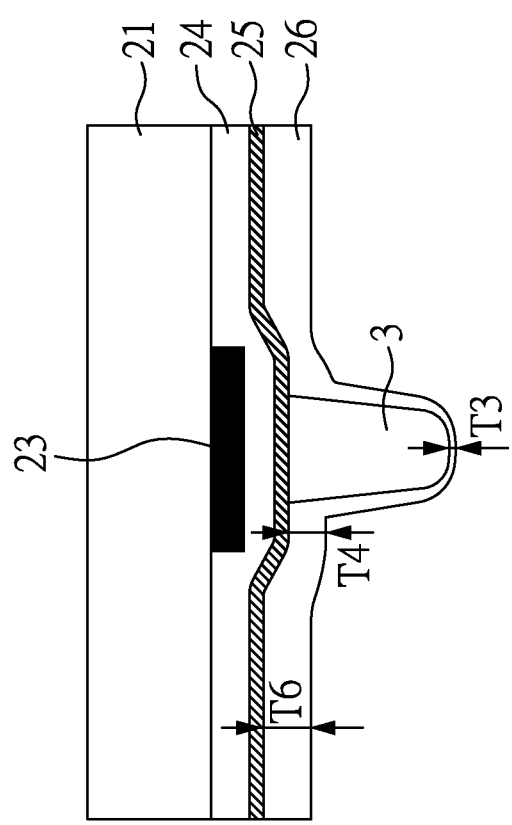
FIG. 4 is a cross-sectional view showing a second substrate and a structure formed thereon according to one preferred embodiment of the present invention.

FIG. 4 is a cross-sectional view showing a second substrate and a structure formed thereon according to the present embodiment. As shown in FIG. 4, a black matrix 23, a third protection layer 24, a common electrode layer 25, a spacer 3 and a second alignment layer 26 are sequentially laminated on the second substrate 21, wherein the third protection layer 24 covers the black matrix 23 and the second substrate 21, the common electrode layer 25 covers the third protection layer 24, the spacer 3 disposed on the common electrode layer 25 and corresponds to the black matrix 23, and the second alignment layer 26 is disposed on the spacer 3 and the black matrix 23. Herein, the dispositions of the black matrix 23 and the spacer 3 correspond to the TFT unit 14 shown in FIG. 3A-3C. The third protection layer 24 can be made of the same material as those for the first protection layer 145 and the second protection layer 146 on the first substrate 11 (as shown in FIG. 3A), so the material thereof is not described herein. In addition, the common electrode layer 25 of the present embodiment can be a planar electrode layer generally used in the art, and the material thereof can be any transparent conductive material generally used in the art, such as transparent conductive oxide comprising ITO or IZO. In addition, the second alignment layer 26 can be formed by the same process for manufacturing the first alignment layer, so the process for manufacturing the same are not illustrated herein. It should be noted that the second alignment layer 26 of the present embodiment may also have different thickness, which is adjusted according to the heights of the units below the second alignment layer 26; and therefore, the altitude difference of the upper surface of the second alignment layer 26 can be minimized. Hereinafter, the design of the thickness of the second alignment layer 26 is described in detail.

As shown in FIG. 4, the second alignment layer 26 on the spacer 3 has a third thickness T3, that on the black matrix 23 has a fourth thickness T4, and that on the second substrate 221 has a sixth thickness T6, and the sixth thickness T6 is larger than the fourth thickness T4 as well as the fourth thickness T4 is larger than the third thickness T3. When the thickness of the second alignment layer 26 is compared with that of the first alignment layer 16 on the first substrate (as shown in FIG. 3A), the third thickness T3 is thinner than the thickness of the first alignment layer 16 in both the pixel electrode region Px and the non-pixel electrode region Px'. In some embodiments, the third thickness T3 of the second alignment layer 26 on the spacer 3 is very thin, and almost close to 0 nm; and in other word, the third thickness thereof is hardly to be detected, even with a scanning electron microscope (SEM).

In the present embodiment, the material for the alignment layer (including the first alignment layer 16 and the second alignment layer 26) is not particularly limited, and can be any material generally used in the art, such as polyimide (PI), polyvinylcinnamate (PVCN) and polymethylmethacrylate (PMMA). However, the material thereof is not limited thereto. Preferably, the material for the alignment layer of the present embodiment is PI having high viscosity.

After the first substrate 11, the second substrate 21 and the units formed thereon are prepared, as shown in FIG. 1, the first substrate and the second substrate are assembled and sealed with a sealant 5, and then liquid crystal molecules are injected therein to form a liquid crystal layer 4, to complete the liquid crystal display panel of the present embodiment. In order to improve the adhesion between the sealant 5 and the first alignment layer 16 as well as the second alignment layer 26 (as shown in FIG. 1, FIGS. 3A-3C and FIG. 4), the peripheries of the first alignment layer 16 and the second alignment layer 26 are designed to have microstructures. Hereinafter, the microstructures of the peripheries of the first alignment layer 16 and the second alignment layer 26 are described in detail, wherein the peripheries of the first alignment layer 16 and the second alignment layer 26 can have identical or different microstructures. Herein, only the structure of the first alignment layer 16 is exemplified, and that of the second alignment layer 26 are not described below.

Figure 5:
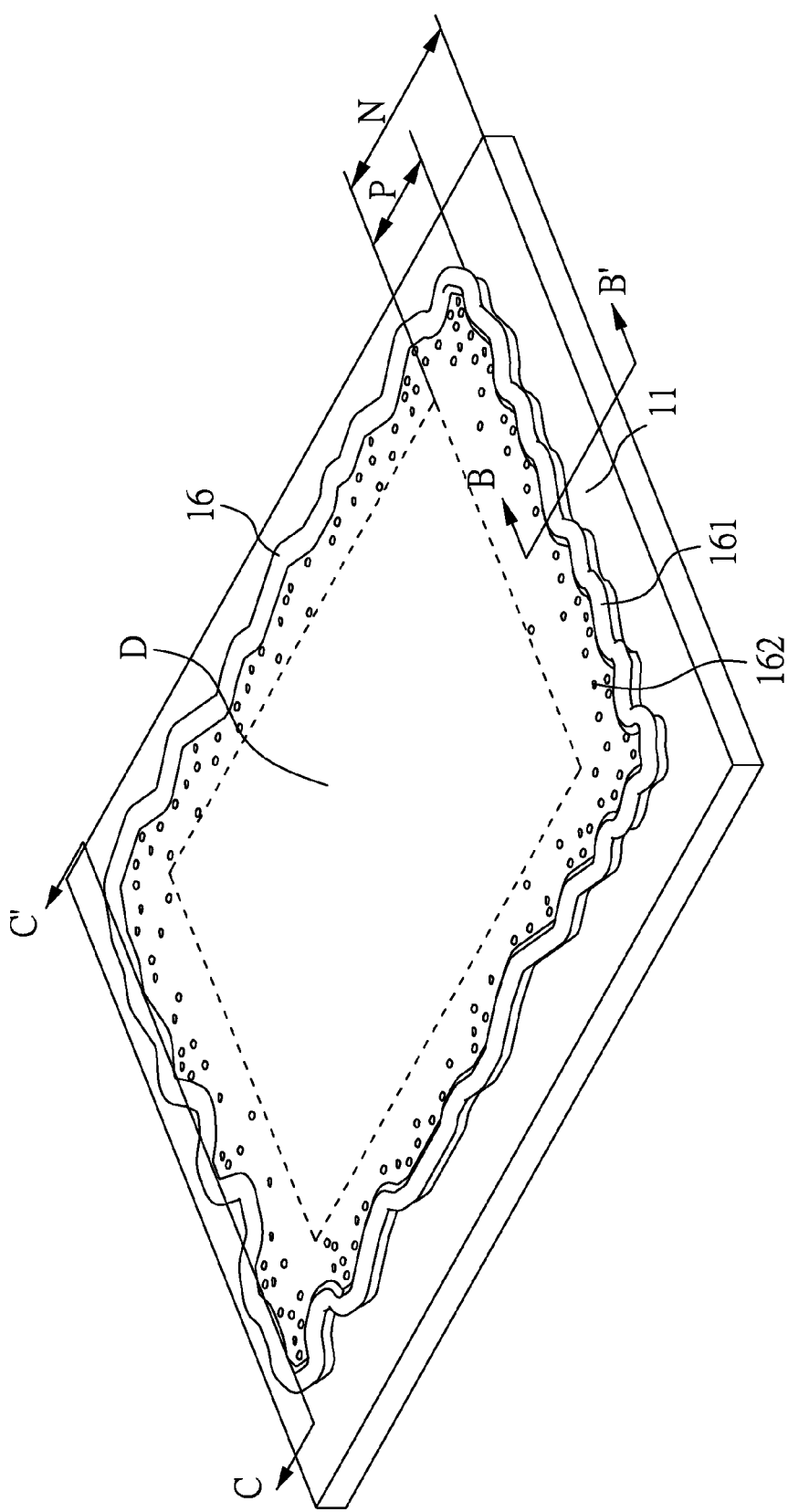
FIG. 5 is a perspective view showing a first alignment layer on a first substrate according to one preferred embodiment of the present invention.

FIG. 5 is a perspective view showing a first alignment layer on a first substrate in the liquid crystal display panel of the present embodiment. As shown in FIG. 5, in the liquid crystal display panel of the present embodiment, the first alignment layer 16 is disposed on the first substrate 11, and a protrusion 161 and plural humps 162 are further disposed on the periphery P of the first alignment layer 16. If the first substrate 11 is defined to have a display region D and a non-display region N, the protrusion 161 and the humps 162 are disposed on the non-display region N of the first substrate 11. In the present embodiment, the material of the first alignment layer 16 is the same as those of the protrusion 161 and the humps 162, and the protrusion 161 and the humps 162 are integrated with the first alignment layer 16. Herein, an APR plate or a photo mask having patterns corresponding to the first alignment layer 16 and the protrusion 161 can be used to form the first alignment layer 16 and the protrusion 161 at the same time; or an APR plate or a photo mask having patterns corresponding to the first alignment layer 16, the protrusion 161 and the humps 162 can be used to form the first alignment layer 16, the protrusion 161 and the humps 162 at the same time. However, in other embodiment, the humps 162 may not be formed by using an APR plate or a photo mask having patterns corresponding to the humps 162, and can be spontaneously formed by the particles (including nucleuses, crystals, grains or aggregations) generated during the polymerization of the material for the alignment layer.

Figure 6A:
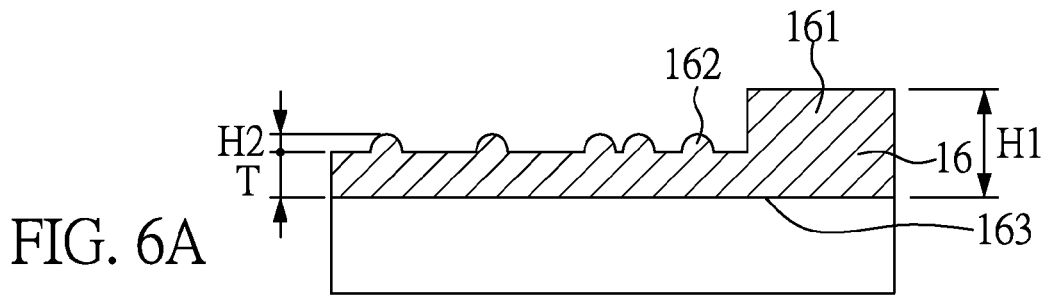
FIGS. 6A-6D are cross-sectional views showing a first alignment layer in a non-display region according to one preferred embodiment of the present invention.
Figure 6B:
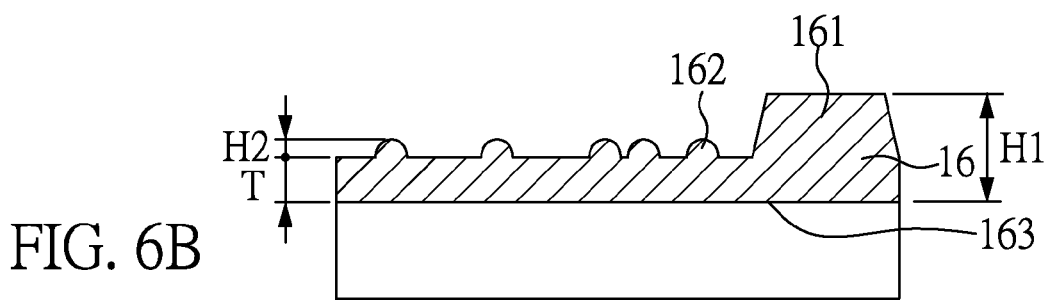
Figure 6C:
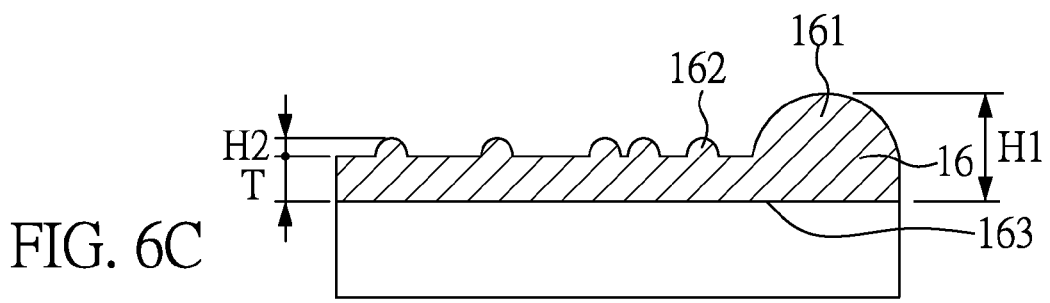
Figure 6D:
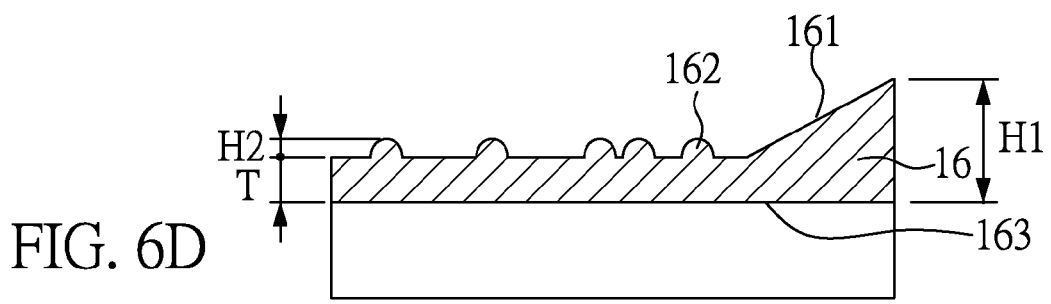

FIGS. 6A-6D are cross-sectional views showing a first alignment layer in a non-display region N according to the B-B' section line of FIG. 5. As shown in FIG. 6A, a ratio of a height H1 of the protrusion 161 (i.e. the distance between the top of the protrusion 161 to a surface 163 of the first alignment layer 16) to a thickness T of the first alignment layer 16 adjacent to the protrusion 161 is in a range from 2 to 10. Herein, the height H1 can be in a range from 150 nm to 300 nm, and the thickness T can be in a range from 10 nm to 100 nm. However, the present invention is not limited to the aforementioned range, as long as the protrusion 161 has a specific altitude relative to the first alignment layer 16 to increase the pressure that the periphery of the alignment layer applies to the substrate and the adhesion between the alignment layer and the substrate. Additionally, the disposition thereof can also solve the problem of the overflow of the material for preparing the alignment layer and the shrink of the alignment layer during the curing process, and therefore the shift of the alignment layer can be inhibited. In addition, plural humps 162 are further disposed besides the protrusion 161 of the first alignment layer 16, and the height H2 thereof can be in a range from 5 nm to 30 nm. However, the present invention is not limited thereto. Furthermore, the protrusion 161 shown in FIG. 6A has a side vertical to the surface 163 of the first alignment layer 16. In other embodiment, both the two sides of the protrusion 161 may be inclined planes (as shown in FIG. 6B); the protrusion 16 is in an arc shape (as shown in FIG. 6C); or one side of the protrusion 161 is vertical to the surface 163 of the first alignment layer 16, and the other side thereof is an inclined plane (as shown in FIG. 6D). However, the present invention is not limited thereto. In addition, all the protrusions 161 shown in FIGS. 6A-6D have an even surface, but the protrusions 161 may have an uneven surface or a ridge-like structure in some embodiments.

Figure 7A:
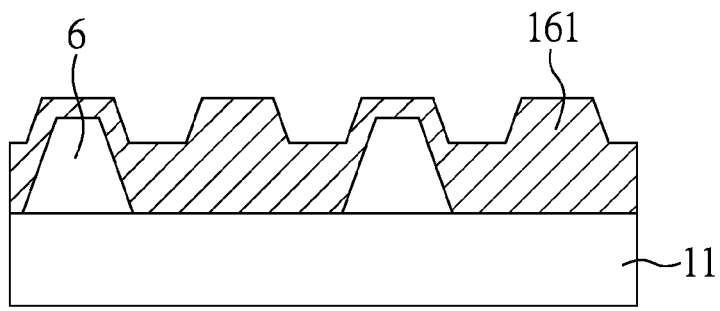
FIGS. 7A-7C are cross-sectional views showing a first alignment layer in a non-display region according to one preferred embodiment of the present invention.
Figure 7B:
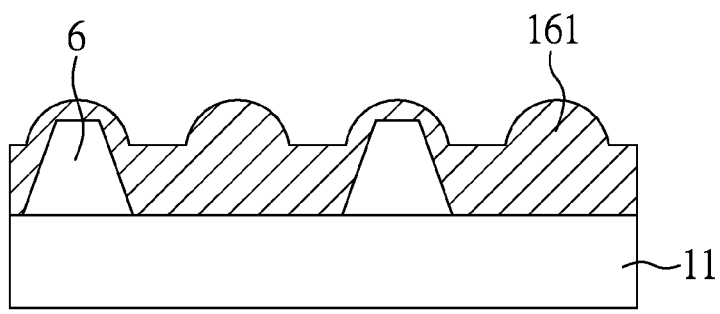
Figure 7C:
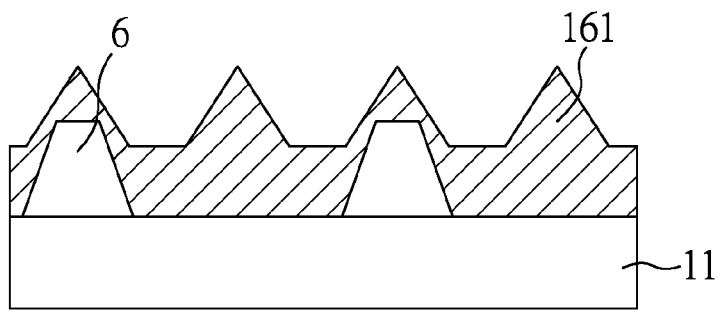

FIGS. 7A-7C are cross-sectional views showing a first alignment layer in a non-display region N according to the C-C' section line of FIG. 5. In general, circuits are formed in the non-display region N of the liquid crystal display panel, and the first alignment layer 16 may further be disposed on the circuits 6 therein.

Figure 8A:
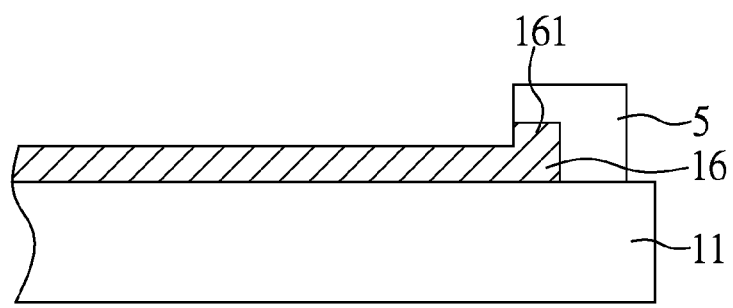
FIG. 8A is a perspective view showing a first alignment layer and a sealant according to one preferred embodiment of the present invention.

After the liquid crystal display panel of the present embodiment is sealed with a sealant 5, the relative position between the protrusions 161 of the first alignment layer 16 and the sealant 5 can be shown in FIG. 8A. The sealant 5 covers the protrusions 161 to increase the contacting area between the sealant 5 and the first alignment layer 16, and therefore the peeling between the sealant 5 and the first alignment layer 16 can be prevented. In addition, as shown in FIG. 8A, the edge of the first substrate 11 is protruded from the sealant 5.

Figure 8B:
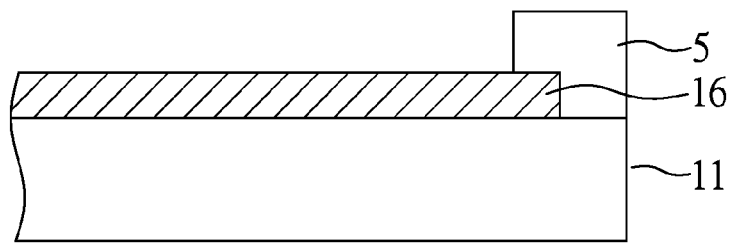
FIG. 8B is a perspective view showing a first alignment layer and a sealant according to another preferred embodiment of the present invention.

However, in another embodiment of the present invention, the edge of the first substrate 11 is substantially aligned with the edge of the sealant 5, as shown in FIG. 8B. In addition, in further another embodiment of the present invention, the material for preparing the alignment layer is PI with low viscosity. Therefore, the protrusion 161 shown in FIG. 8A cannot be formed, but the periphery of the first alignment layer 16 is configured in a curve structure, such as a wave structure, as shown in FIG. 10.

Figure 9:
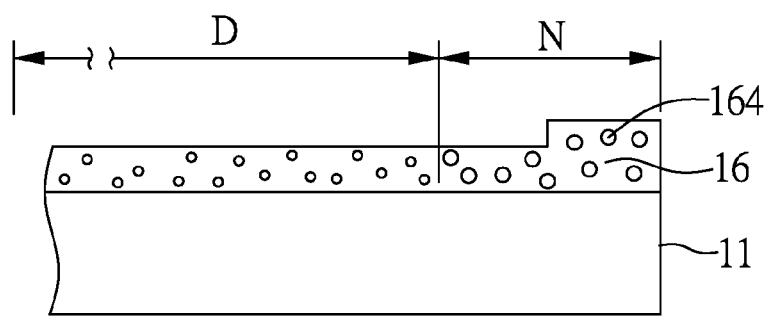
FIG. 9 is a perspective view showing a first alignment layer according to one preferred embodiment of the present invention.
Figure 10:
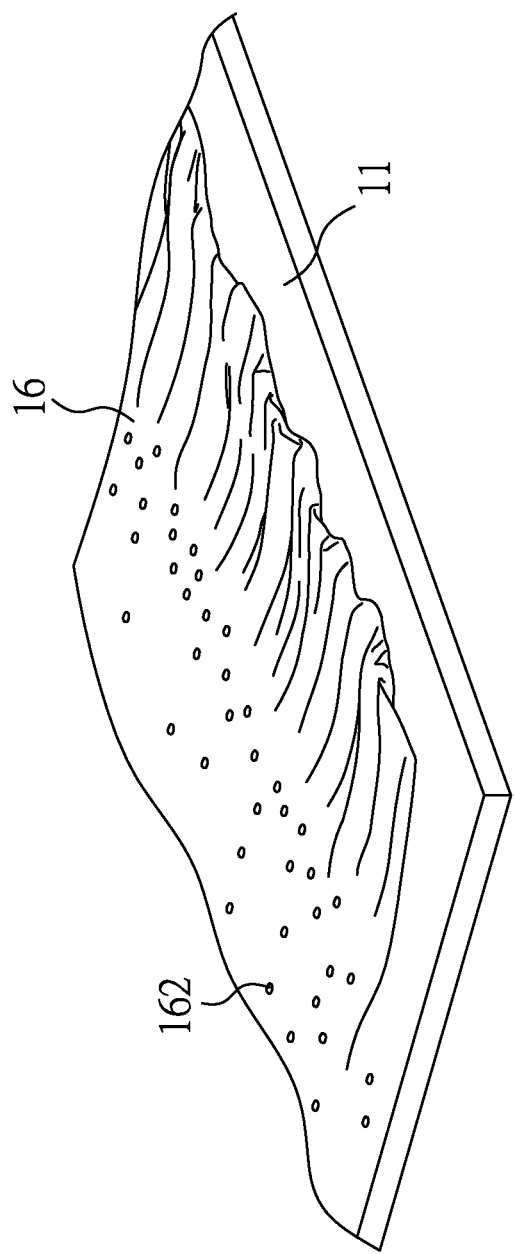
FIG. 10 is a perspective vies showing a first alignment layer on a first substrate according to another preferred embodiment of the present invention.

In both the first alignment layer 16 with the protrusion 161 and the humps 162 formed thereon as shown in FIG. 6 and that with humps 162 formed thereon and having a wave configuration as shown in FIG. 10, plural particles 164 may be formed in the first alignment layer 16. These particles 164 can be nucleuses, crystals, grains or aggregations generated during the curing process, as shown in FIG. 9. In particular, the size of the particles 164 in the non-display region N is larger than that in the display region D. In addition, in other embodiment, the particles 164 are only present in the non-display region N but not in the display region D; or there are no particles formed in the first alignment layer 16.

It should be noted that only the first alignment layer 16 on the first substrate 11 is exemplified in FIG. 5 to FIG. 9. However, a person skilled in the art can understand that other units (such as the TFT unit) between the first substrate 11 and the first alignment layer 16 are not shown herein.

Figure 11:
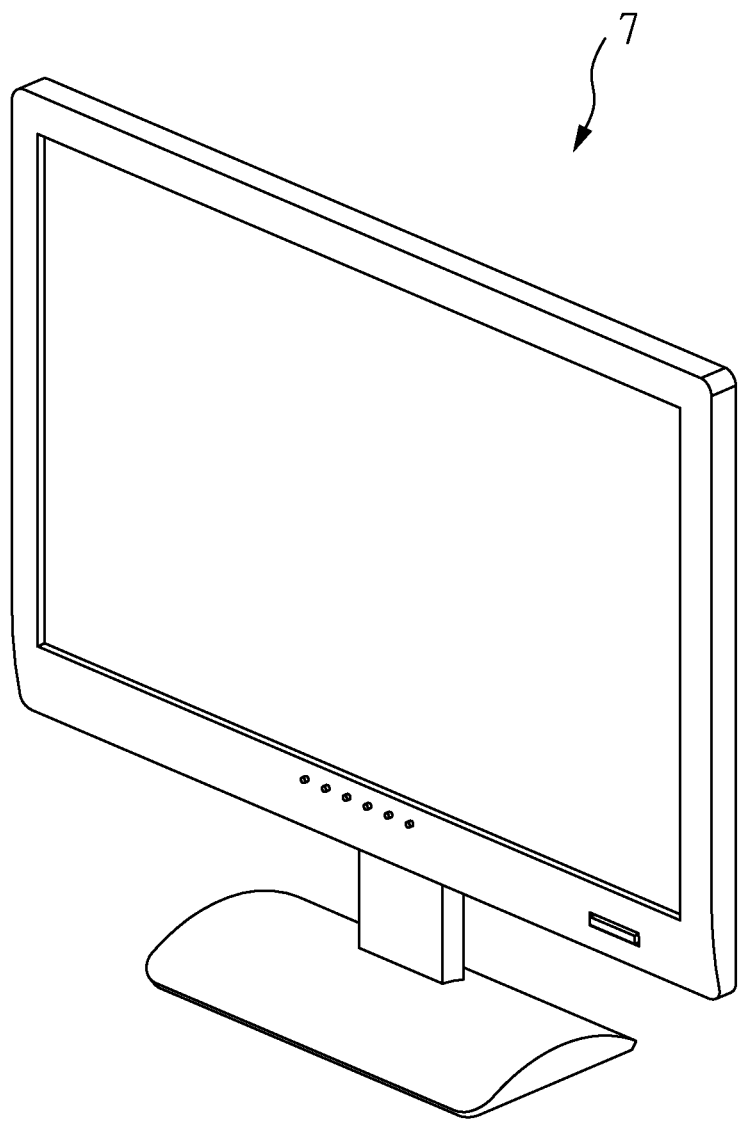
FIG. 11 is a perspective view showing a liquid crystal display device of the present invention.

Moreover, the liquid crystal display panels of the aforementioned embodiments can further be applied to a liquid crystal display device 7, as shown in FIG. 11. Herein, the liquid crystal display device 7 comprises: a backlight module; and the aforementioned liquid crystal display panel disposed on the backlight module (not shown in the figure). Herein, only the liquid crystal display device is exemplified, other display devices such as a mobile phone, a notebook, a camera, a video camera, a music player, a navigation system, or a television can also be equipped with the liquid crystal display panels of the aforementioned embodiments.

Although the present invention has been explained in relation to its preferred embodiment, it is to be understood that many other possible modifications and variations can be made without departing from the spirit and scope of the invention as hereinafter claimed.

What is claimed is:

1. A liquid crystal display panel, comprising:
    a first substrate having a display region and a non-display region, and the first substrate having a pixel electrode region and a non-pixel electrode region, wherein the non-display region is located outside the display region, the non-pixel electrode region is adjacent to the pixel electrode region;
    a second substrate opposite to the first substrate;
    a first alignment layer disposed on the pixel electrode region and the non-pixel electrode region, wherein the first alignment layer comprises at least one protrusion, the protrusion is integrated with the first alignment layer, and the protrusion is at the periphery of the first alignment layer corresponding to the non-display region; and
    a liquid crystal layer disposed between the first substrate and the second substrate,
    wherein the first alignment layer corresponding to the pixel electrode region has a first thickness, the first alignment layer corresponding to the non-pixel electrode region has a second thickness, the first thickness is greater than the second thickness, and
    wherein the first alignment layer corresponding to the protrusion has a third thickness, the first alignment layer corresponding to a region located between the display region and the protrusion has a fourth thickness, and the third thickness is greater than the fourth thickness.

2. The liquid crystal display panel as claimed in claim 1, wherein the pixel electrode region comprises a pixel electrode, the non-pixel electrode region comprises a data line and a scan line, the first alignment layer corresponding to the pixel electrode has the first thickness, and the first alignment layer corresponding to at least one of the data line and the scan line has the second thickness.

3. The liquid crystal display panel as claimed in claim 1, wherein the first alignment layer comprises plural particles.

4. The liquid crystal display panel as claimed in claim 2, wherein a thin film transistor unit and a first protection layer are further disposed on the first substrate, the thin film transistor unit comprises: a gate electrode, an insulating layer, a semiconductor layer, a source electrode and a drain electrode; wherein the insulating layer covers the gate electrode, the semiconductor layer is disposed on the insulating layer, the source electrode and the drain electrode are disposed on the semiconductor layer and separated in a predetermined distance to form a channel region, the first protection layer covers the thin film transistor unit and has an opening to expose the drain electrode, the pixel electrode is disposed on the first protection layer and extends into the opening to electrically connect with the drain electrode, the first alignment layer in the opening has a seventh thickness, and the seventh thickness is greater than the first thickness.

5. The liquid crystal display panel as claimed in claim 1, wherein a ratio of a height of the protrusion to a thickness of the first alignment layer adjacent to the protrusion is in a range from 2 to 10.

6. The liquid crystal display panel as claimed in claim 1, wherein an edge of the first alignment has a wave configuration.

7. The liquid crystal display panel as claimed in claim 1, further comprising a sealant disposed between the first substrate and the second substrate, and covering parts of the first alignment layer.

8. The liquid crystal display panel as claimed in claim 1, further comprising a sealant disposed between the first substrate and the second substrate and covering parts of the protrusion.

9. The liquid crystal display panel as claimed in claim 1, wherein a ratio of the first thickness to the second thickness is in a range from greater than 1 to less than or equal to 10.

10. The liquid crystal display panel as claimed in claim 1, further comprising a color filter unit disposed on the first substrate and between the first substrate and the first alignment layer.

11. The liquid crystal display panel as claimed in claim 1, further comprising at least one spacer, a black matrix and a second alignment layer, wherein the black matrix is disposed on the second substrate; the spacer is disposed between the first substrate and the second substrate and corresponds to the black matrix; the second alignment layer is disposed on the second substrate, the black matrix and the spacer; the second alignment layer corresponding to the spacer has a fifth thickness; the second alignment layer corresponding to the black matrix has a sixth thickness; and the sixth thickness is greater than the fifth thickness.

12. The liquid crystal display panel as claimed in claim 11, wherein the second alignment layer on the second substrate without overlapping with the black matrix has a eighth thickness, and the eighth thickness is larger than the sixth thickness.

13. The liquid crystal display panel as claimed in claim 1, which is applied to a liquid crystal display device being a mobile phone, a notebook, a camera, a video camera, a music player, a navigation system, or a television.

14. A liquid crystal display panel, comprising:
    a first substrate having a pixel electrode region and a non-pixel electrode region, wherein the non-pixel electrode region is adjacent to the pixel electrode region;
    a thin film transistor unit disposed on the first substrate;
    a second substrate opposite to the first substrate;

a first alignment layer disposed on the pixel electrode region and the non-pixel electrode region;
a plurality of color filter units disposed on the first substrate and between the first substrate and the first alignment layer, one of the color filter units comprising a color filter opening to expose a drain electrode of the thin film transistor unit;
wherein the pixel electrode region comprises a pixel electrode, a part of the pixel electrode extends into the color filter opening to connect to the drain electrode of the thin film transistor unit, a region of the pixel electrode without overlapping the thin film transistor unit is defined as a non-overlapping region, the non-pixel electrode region comprises an overlapping region that two adjacent color filter units overlap, one of a data line and a scan line is disposed corresponding to the overlapping region, the first alignment layer corresponding to the non-overlapping region on the pixel electrode has a first thickness, the first alignment layer corresponding to the overlapping region has a second thickness, the first alignment layer corresponding to the color filter opening has a third thickness, the first thickness is greater than the second thickness, and the third thickness is greater than the first thickness.

\* \* \* \* \*